(12) United States Patent
Susarla et al.

(10) Patent No.: US 8,868,400 B2
(45) Date of Patent: Oct. 21, 2014

(54) MODELING STORAGE ENVIRONMENTS

(75) Inventors: Sai Rama Krishna Susarla, Karnataka (IN); Thirumale Niranjan, Karnataka (IN); Siddhartha Nandi, Karnataka (IN); Craig Fulmer Everhart, Chapel Hill, NC (US); Kaladhar Voruganti, San Jose, CA (US); Jim Voll, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 681 days.

(21) Appl. No.: 12/112,000

(22) Filed: Apr. 30, 2008

(65) Prior Publication Data

US 2009/0276202 A1    Nov. 5, 2009

(51) Int. Cl.
  *G06F 9/44*    (2006.01)
  *G06F 13/10*   (2006.01)
  *G06F 13/12*   (2006.01)
  *H04L 12/24*   (2006.01)
  *G06F 11/34*   (2006.01)

(52) U.S. Cl.
  CPC .......... *H04L 41/145* (2013.01); *G06F 11/3495* (2013.01); *G06F 11/3485* (2013.01); *G06F 11/3447* (2013.01); *G06F 11/3414* (2013.01)
  USPC ........................................ 703/21

(58) Field of Classification Search
  USPC ............. 703/21; 709/220, 223, 228; 707/802, 707/809, 810, 821, 790
  See application file for complete search history.

(56) References Cited

U.S. PATENT DOCUMENTS

| | | | |
|---|---|---|---|
| 6,542,854 B2 | 4/2003 | Yang et al. | |
| 6,622,221 B1 | 9/2003 | Zahavi | |
| 6,957,433 B2 | 10/2005 | Umberger et al. | |
| 6,993,469 B1 * | 1/2006 | Bortfeld | 703/15 |
| 7,103,874 B2 * | 9/2006 | McCollum et al. | 717/121 |
| 7,184,933 B2 | 2/2007 | Prekeges et al. | |
| 7,308,397 B2 * | 12/2007 | Jibbe et al. | 703/24 |
| 7,493,300 B2 | 2/2009 | Palmer et al. | |
| 7,519,624 B2 | 4/2009 | Korupolu et al. | |
| 7,930,163 B2 | 4/2011 | Everhart et al. | |
| 2004/0205089 A1 | 10/2004 | Alon et al. | |
| 2005/0256961 A1 | 11/2005 | Alon et al. | |
| 2005/0262233 A1 | 11/2005 | Alon et al. | |

(Continued)

FOREIGN PATENT DOCUMENTS

| | | |
|---|---|---|
| DE | 3935711 | 5/1990 |
| WO | WO-2006037711 | 4/2006 |
| WO | WO-2009134255 A2 | 11/2009 |
| WO | WO-2009134262 A1 | 11/2009 |

OTHER PUBLICATIONS

Chao et al., Using MMQ Model for Performance Simulation of Storage Area Network, 2005, IEEE, pp. 1-4.*

(Continued)

*Primary Examiner* — Omar Fernandez Rivas
*Assistant Examiner* — Bernard E Cothran
(74) *Attorney, Agent, or Firm* — Mahamedi Paradice LLP

(57) ABSTRACT

Example embodiments provide various techniques for modeling network storage environments. To model a particular storage environment, component models that are associated with the components of the storage environment are loaded. Each component model is programmed to mathematically simulate one or more components of the storage environment. A system model is then composed from the component models and this system model is configured to simulate the storage environment.

21 Claims, 9 Drawing Sheets

(56) References Cited

U.S. PATENT DOCUMENTS

| | | | |
|---|---|---|---|
| 2006/0037019 A1* | 2/2006 | Austin et al. | 718/100 |
| 2007/0016394 A1* | 1/2007 | Gaudette | 703/19 |
| 2007/0088763 A1 | 4/2007 | Yahalom et al. | |
| 2007/0245004 A1* | 10/2007 | Chess et al. | 709/223 |
| 2009/0276203 A1 | 11/2009 | Everhart et al. | |

OTHER PUBLICATIONS

"International Application Serial No. PCT/US2008/062046, Search Report mailed Feb. 3, 2009".

"International Application Serial No. PCT/US2008/062046, Written Opinion mailed Feb. 3, 2009".

"International Application Serial No. PCT/US2008/062074, Search Report mailed Feb. 9, 2009".

"International Application Serial No. PCT/US2008/062074, Written Opinion mailed Feb. 9, 2009".

Aizikowitz, N., et al., "Component-Based Performance Modeling of a Storage Area Network", Proceeding of the 2005 Winter Simulation conference (Dec. 4, 2005), 10 pgs.

Chao-Yang, W., et al., "Simulation and analysis of fc networks", *Local computer networks*, 2003, Proceedings. 28th Annual IEEE, International conference (Oct. 20, 2003), 4 pgs.

Chao-Yang, W., et al., "Simulation of fibre channel storage area network using SANSim", *The 11th IEEE International Conference on Network* (Sep. 28, 2003), 6 pgs.

Ganger, G. R, et al., "Using system-level models to evaluate I/O subsystem designs", *IEEE Transactions on Computers*, vol. 47 No. 6 (Jun. 1998), 12 pgs.

Lu, Y., et al., "Simulation Study of ISCSI Storage System", *Mass Storage Systems and Technologies*, 2004, Proceedings., 21 IEEE / 12th NASA Goddard Conference, Piscataway, NJ, USA, IEEE, XP002511846, (Apr. 2004) 10 pgs.

Min, W., et al., "A Component-Based Analytical Performance Model of IP-Based San", Institute of Computing Technology, Chinese Academy of Science. Beijing 100080, Graduate school of the Chinese Academy of Science, Beiiing 100039 (May 2, 2007), 12pgs.

Molero, X, et al., "On the effect of link failures in fibre channel storage area networks", *Parallel Architectures, Algorithms and networks*. Proceedings. International Symposium on Dallas (Dec. 7, 2000), 10 pgs.

Molero, X., et al., "Modeling and Simulation of storage area networks", *Modeling, Analysis and Simulation of computer & telecommunication systems*, Proceedings. 8th international symposium on San Francisco, CA, USA (Aug. 29, 2000), 9 Pgs.

Yijian, W., et al., "Execution-driven simulation of network storage systems", The IEEE computer society's 12th annual International symposium on volendam (Oct. 4, 2004), 8 pgs.

U.S. Appl. No. 60/420,644, filed Oct. 23, 2002, Alon, Roy , et al.
U.S. Appl. No. 60/564,837, filed Apr. 23, 2004, Alon, Roy , et al.
U.S. Appl. No. 60/565,064, filed Apr. 23, 2004, Alon, Roy , et al.
U.S. Appl. No. 60/720,977, filed Sep. 27, 2005, Alon, Roy , et al.

"U.S. Appl. No. 12/112,009 Non-Final Office Action mailed Nov. 8, 2010", 27 pgs.

"U.S. Appl. No. 12/112,009, Notice of Allowance mailed Mar. 1, 2011", 14 pgs.

"U.S. Appl. No. 12/112,009, Response filed Feb. 8, 2011 to Non Final Office Action mailed Nov. 8, 2010", 15 pgs.

"U.S. Appl. No. 12/112,000 Advisory Action mailed Apr. 8, 2011", 3 Pgs.

Anderson, et al., "Ergastulum: Quickly Finding Near-Optimal Storage System Designs", HP Tech Report HPL-SSP-2001-5, (May 2001), 25.

Brienbrink, et al., "Sim Lab: A Simulation Environment for Storage Area Networks", In Workshop on Parallel and Distributed Processing, (2001), 8 pgs.

Ganger, et al., "The DiskSim Simulation Environment Version 2.0 Reference Manual", (Dec. 1999), 64 pgs.

Jin, et al., "Performance Evaluation and Prediction for Legacy Information Systems", 29th International Conference on Software Engineering, (May 20-26, 2007), 10 pages.

Singh, et al., "Zodiac: Efficient Impact Analysis for Storage Area Networks", Proceedings of the 4th USENIX Conference on File, (Dec. 13-16, 2005), 14 pgs.

\* cited by examiner

MODELING STORAGE ENVIRONMENTS

FIELD

The present disclosure relates generally to computer modeling. In an example embodiment, the disclosure relates to the modeling of storage environments.

BACKGROUND

A storage environment can be a complex system because of the numerous components included in the storage environment. Examples of components may include network pipes, caches, storage servers, switches, storage controllers, and other components. As a result, the maintenance and design of such a complex storage environment are time-consuming tasks. For example, administrators currently troubleshoot problems of a deployed storage environment manually. The manual process of troubleshooting the storage environment can be labor intensive and time consuming. Further, the process of troubleshooting the storage environment may require the storage environment to be temporarily shutdown, which therefore also renders software applications that rely on the storage environment inoperable.

SUMMARY

Generally, a computer model is a computer program that is programmed to mathematically simulate a variety of systems, such as natural systems, biological systems, and computer systems. Example embodiments of the present invention provide various techniques for modeling a storage environment. In general, a storage environment is a system of computing devices and storage devices where data is stored on the storage devices such that the data can be made available to a variety of client computing devices on a network. It should be appreciated that the storage environment may include a variety of hardware and/or software components, such as computers, memories, hard drives, operating systems, software applications, and other components.

To model a particular storage environment, component models associated with the components of the storage environment are loaded. Similar to the system model of the storage environment, each component model is programmed to mathematically simulate one or more components of the storage environment. A system model is then composed from the component models. In effect, the system model is constructed from the component models. In an example, the system model may be constructed by connecting the component models with each other based on functional relationships between the component models. The structure of the composed system model may be in the form of or resemble a directed graph. Accordingly, the system model may be represented as a directed graph. In general, a directed graph includes nodes with lines and/or arrows connecting the nodes. The directed graph may therefore illustrate an architecture of the storage environment. It should be appreciated that the system model may also be depicted by a variety of other representations or diagrams.

With the system model, a simulated workload may then be applied to the system model and the directed graph (or other representations) may be used to illustrate the simulated impact of the simulated workload on the storage environment. In effect, the directed graph can be used to illustrate the simulated behavior of a storage environment when, for example, subjected to various workloads. As a result, for example, a user can use such impact information to analyze, troubleshoot, maintain, and/or design the storage environment.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

A computer model is a computer program that can be programmed to simulate a variety of systems, such as computer systems. In an example, a computer model can be used to mathematically predict the behavior of a system without access to the actual system that is being simulated. In effect, a computer model is actually a mathematical model carried out by a computing device, such as a computer. The mathematical model may be constructed to find analytical solutions to various types of problems, such as prediction of weather and physics simulation.

In an example, a computer model can be used to predict the behavior of a storage environment. A storage environment is a system of computing devices and storage devices where data is stored on the storage devices such that the data can be made available to a variety of client computing devices on a network. As explained in more detail below, a computer model of the storage environment may be constructed and this computer model uses a mathematical model of the storage environment to mathematically analyze and/or simulate the storage environment. Such simulation may be used to facilitate the design and management of storage environments by allowing a user, for example, to assess and/or test impacts of simulated workloads on computer models of the storage environments.

Figure 1:
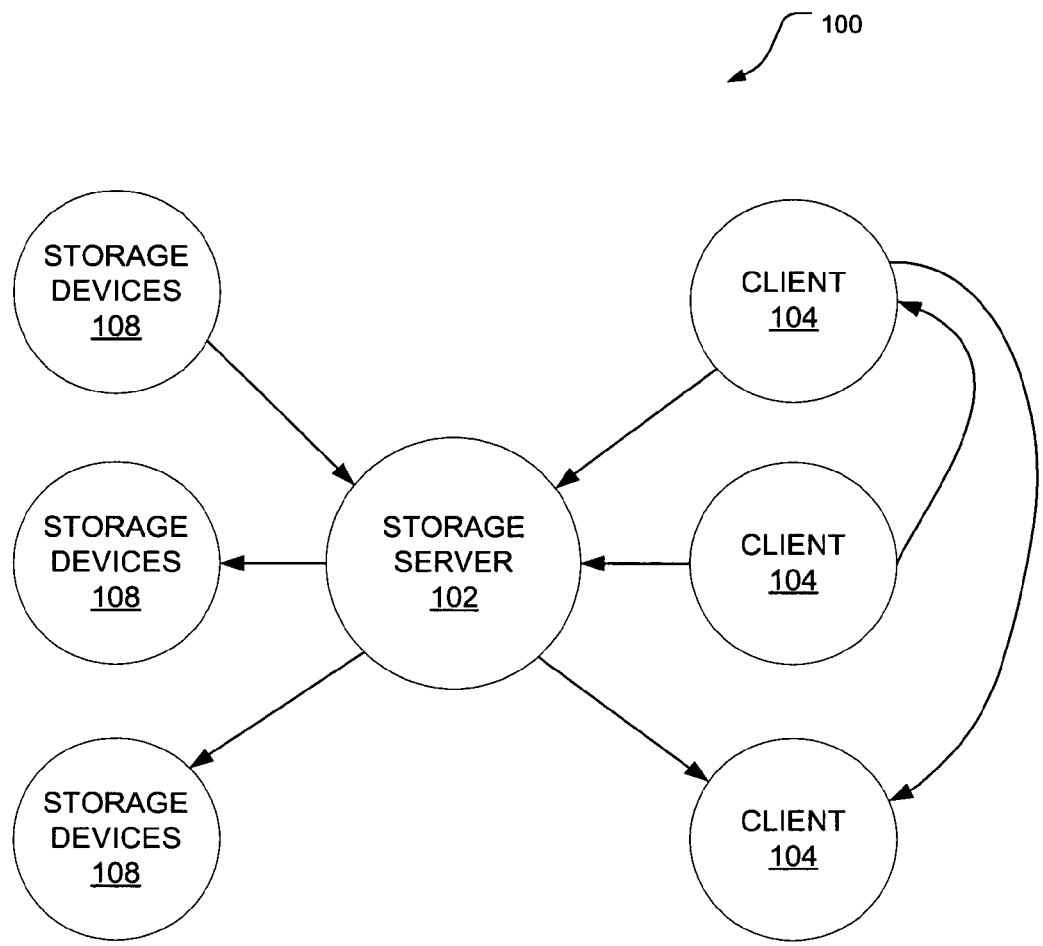
FIG. 1 depicts a representation of a system model of a storage environment, in accordance with an example embodiment.

FIG. 1 depicts a representation of a system model 100 of a storage environment, in accordance with an example embodiment. In general, a storage environment is a system of computing devices and storage devices where data is stored on the storage devices such that the data can be made available to a variety of client computing devices on a network. The storage environment is network-based data storage and, as explained in more detail below, the storage environment can utilize a Storage Area Network (SAN) and/or a Network Attached Storage (NAS) device. The system model 100 is a computer model that is configured to simulate a storage environment. In effect, system model 100 is a functional representation of the storage environment.

A storage environment is comprised of a variety of components. As explained in more detail below, the components of a storage environment may include software applications, hardware, and services. The components of a storage environment may be depicted by a variety of representations or diagrams. For example, as depicted in FIG. 1, each component of the storage environment may be represented as a node in the directed graph of system model 100. Here, the directed graph of system model 100 shows or defines the components of an example storage environment, such as storage devices 108, storage server 102, and clients 104. Additionally, the directed graph defines the functional relationships between the components of the storage environment with arrows between the components. It should be appreciated that a directed graph (or digraph) is a graph whose edges are ordered pairs of nodes. That is, each edge can be followed from one node to another node. An arrow or line that connects one node to another node may, for example, illustrate that the nodes are operatively associated with each other. The direction of the arrows may, for example, illustrate the input/output of data between the nodes. In an example embodiment, the directed graph is non-hierarchical such that the directed graph does not depict a ranking of a node relative to another node. For example, FIG. 1 does not define that a node representing, for example, storage server 102, is ranked relative to nodes representing storage devices 108. Furthermore, each node in a directed graph may be functionally related (or connected) to multiple nodes.

In addition to representing the system model 100 of the storage environment with the directed graph, other representations may be used to depict the components and functional relationships. Another example of a representation may include a mixed graph having directed and undirected edges. In still yet another example, the system model 100 may be represented by a table that lists the components and the functional relationships between the components. Other example representations include flowcharts, weighted graphs, map diagrams, and other representations.

The embodiments described herein provide the modeling of a storage environment. As will be explained in more detail below, to model the storage environment, system model 100 of the storage environment is initially composed. A representation (e.g., a directed graph) can then be constructed based on system model 100. Such a representation may be used to illustrate the simulated behavior of a storage environment when, for example, subjected to various simulated workloads.

Figure 2:
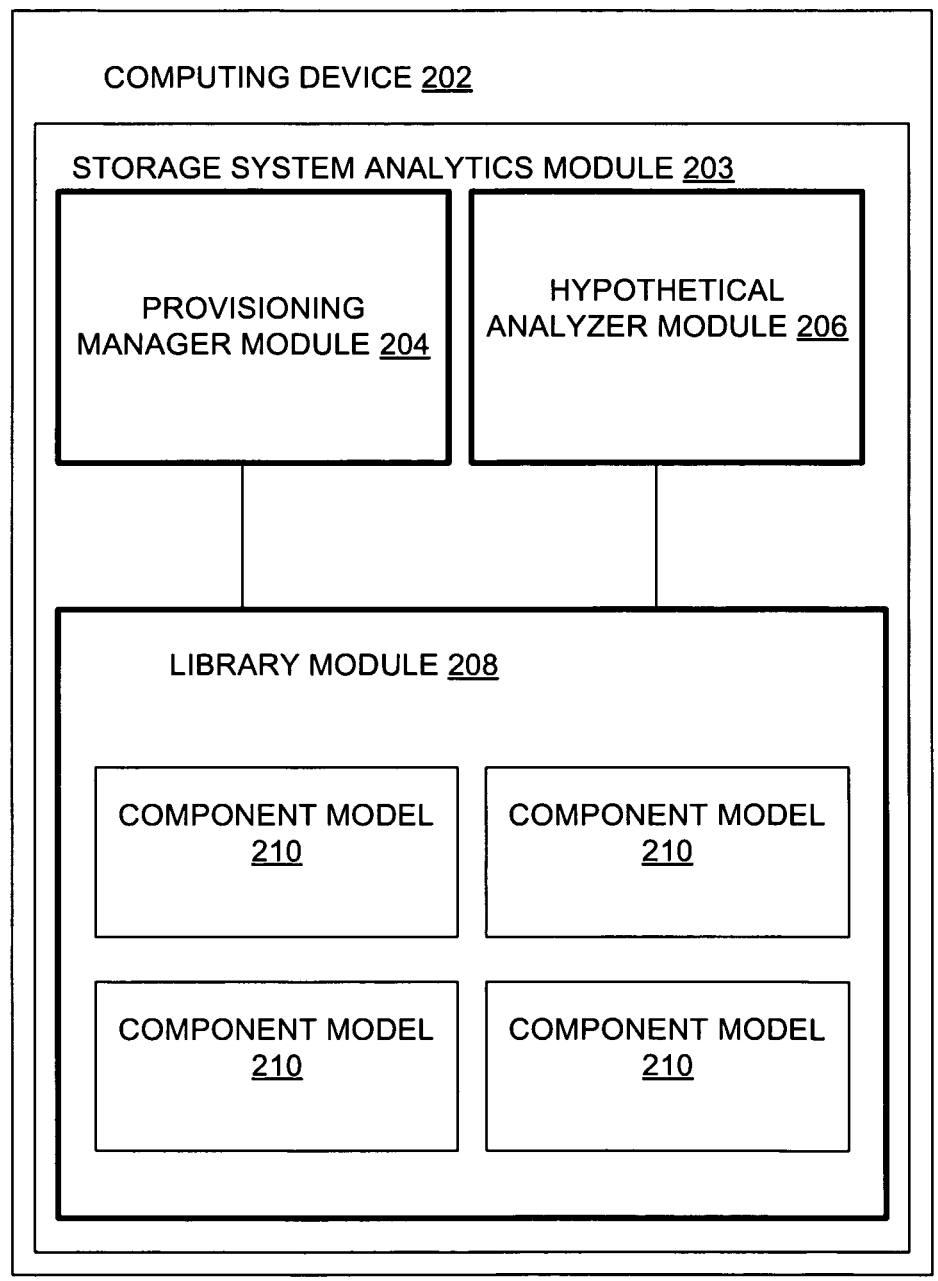
FIG. 2 depicts a simplified block diagram of a storage system analytics module, in accordance with an example embodiment, included in computing device.

FIG. 2 depicts a simplified block diagram of a storage system analytics module 203, in accordance with an example embodiment, included in computing device 202. The computing device 202 is configured to host or execute the storage system analytics module 203. The computing device 202 may be included in a storage environment (e.g., a client computing device in communication with a storage system) or a stand-alone computing device independent of the storage environment. The storage system analytics module 202 is configured to model a storage environment. As depicted in FIG. 2, storage system analytics module 202 may include provisioning manager module 204, hypothetical analyzer model 206, and library module 208. The provisioning manager module 204 and hypothetical analyzer model 206 are operatively associated with library module 208. For example, provisioning manager module 204 and hypothetical analyzer module 206 are in communication with library module 208. It should be appreciated that storage system analytics module 203 may be deployed in a variety of computing devices. For example, computing device 202 may include a personal computer, a server computer or other computing devices.

The library module 208 is a data structure that is configured to store component models 210. In general, a data structure provides context for the organization of data. Examples of data structures include tables, arrays, linked lists, databases, and other data structures. A component model 210 is configured to simulate one or more components associated with a storage environment. In effect, a component model 210 is a functional representation of one or more components associated with a storage environment. Components may include hardware, software, and/or services. The components may be included within a storage environment. Alternately, the components may be configured to work with or communicate with the storage environment. Examples of hardware components associated with a storage environment include storage servers, storage controllers, client computers, hard disk drives, optical disk drives, processors, random access memories, non-volatile memories, tape drives, controllers (e.g., Redundant Array of Independent Disks (RAID) controllers), switches (e.g., Fibre Channel switches), adaptors (e.g., Storage Area Network (SAN) adaptors, Computer System Interface (SCSI) tape adaptors, network adaptors, and other adaptors), power supplies, network pipes, computer buses (Peripheral Component Interconnect (PCI) buses, SCSI buses, and other computer buses), and other hardware components. Examples of software components include operating systems, data replication software, data classification and management software, device drivers, databases, volume managers, file systems, multipathing software, backup and recovery software, antivirus software, networking software, data security or protection software, data search engines, file storage resource management software, data retention software, system management software, performance software, end-user application software, and other software components.

In addition to component models 210 that simulate hardware and software components of a storage environment, the component models may also simulate one or more services, in accordance to an example embodiment. Generally, a service is an act performed by a user. Examples of acts by a user include deploying software, accessing software, and a variety of other acts. In effect, this component model may be a functional representation of a component associated with a service rendered by a user. A component model from component models 210 that simulates a service may be defined by time. For example, a component model may define that a user may take fifty five minutes to deploy a software. In another example, a component model may define that a user may take three minutes to login an operating system.

The component models 210 may be created by a user for use with storage system analytics module 203. For example, component models 210 may be supplied by the manufacturers of the hardware and software components. The component models 210 may include interfaces, code that simulates the components, and rules. The creation of component models 210 may be based on a set of common interfaces to create the system model. Generally, an interface defines a communication boundary between components, such as hardware components, software components, and service components. The rules define, for example, standard methods or procedures. For example, a rule may prohibit one type of hardware component to be interfaced with another type of hardware component. In another example, as explained in more detail below, a rule may specify that component models 210 need particular resources. The rules may also define the functional relationships between component models 210.

In an example embodiment, one or more component models 210 may also include an error associated with the component models. The error may be the accuracy (e.g., as defined by a numerical value) associated with the simulation of the component. For example, a component model configured to simulate a NAS device may show that the NAS device is 90% utilized in simulation. However, in actuality, the NAS device is 60% utilized. Accordingly, an error of 30% may be associated with the component model. This error may then be used for correcting the component model during simulation.

The component models 210 are configured to be plugged into or stored within library module 208. As explained in more detail below, with a given storage environment to be modeled, provisioning manager module 204 may select a portion of component models 210 associated with the storage environment from library module 208. Provisioning manager module 204 can then compose a system model from a portion of component models 210 that is configured to simulate the storage environment. Hypothetical analyzer module 206 may then apply one or more simulated workloads to the system model to identify or define impacts on the storage environment.

It should be appreciated that in other example embodiments, storage system analytics module 203 may include fewer or more modules apart from those shown in FIG. 2. For example, provisioning manager module 204 may be integrated with hypothetical analyzer module 206 to form one module. In another example, provisioning manager module 204 and hypothetical analyzer module 206 may be executed on computing device 202 while library module 208 may be hosted on a separate server.

Figure 3:
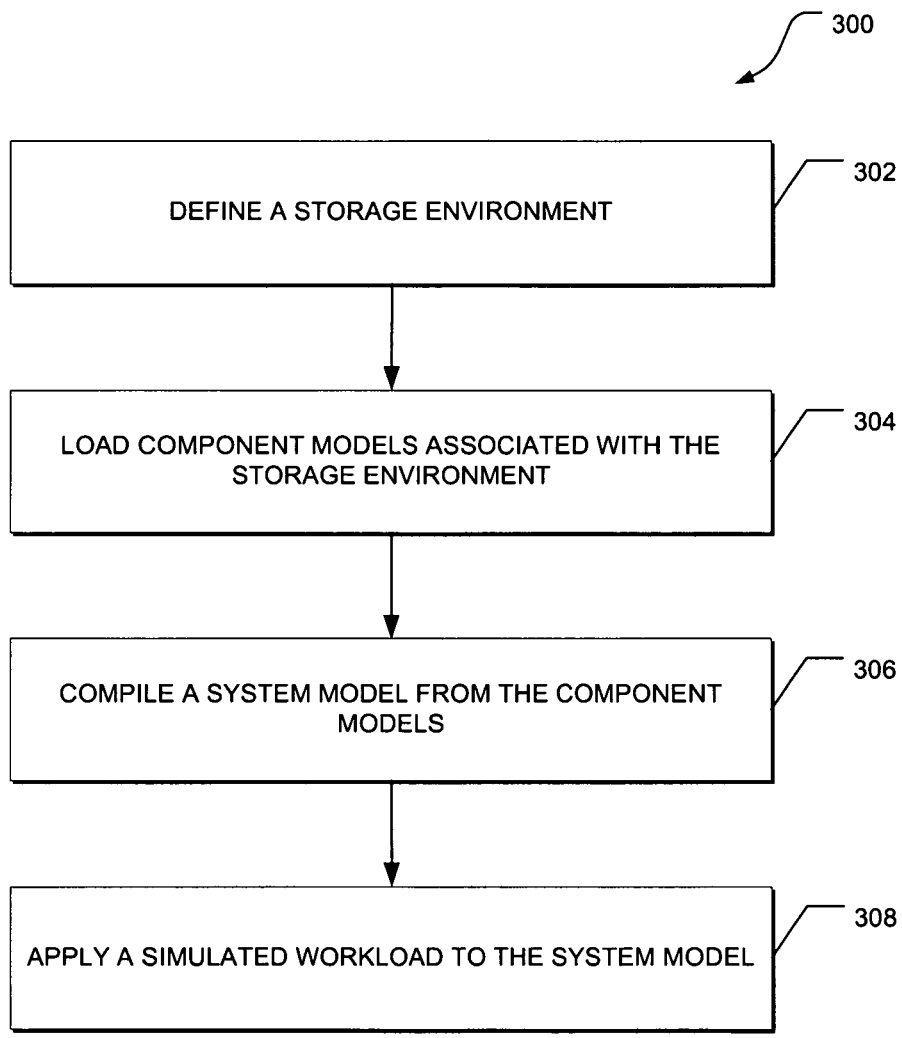
FIG. 3 depicts a flow diagram of a general overview of a method, in accordance with an example embodiment, for modeling a storage environment.

FIG. 3 depicts a flow diagram of a general overview of a method 300, in accordance with an example embodiment, for modeling a storage environment. In an example embodiment, method 300 may be implemented by storage system analytics module 203 of FIG. 2 and employed in computing device 202. As depicted in FIG. 3, a storage environment to be modeled is defined at 302. A user or a software application may define the storage environment to be modeled. The storage environment is comprised of a variety of components and each component may be simulated by one or more component models. At 304, the component models associated with the storage environment are loaded. The loading of component models is to transfer the portion of the component models into the system model. For example, a library module may include a variety of component models associated with a variety of storage environments. A portion of the component models that are associated with the defined storage environment is transferred from the library module to a system model.

After the component models are loaded, the system model is composed from the component models at 306. In general, as explained in more detail below, the system model may be composed or constructed by associating (e.g., connecting) the component models with each other based on functional relationships between the component models. In an example embodiment, the structure of the composed system model may be in the form of or resemble a directed graph. Accordingly, the composed system model can be represented by a directed graph that defines component models and functional relationships between the component models. In addition to the directed graph, as discussed above, the component models may also be depicted by a variety of other representations, such as tables, flowcharts, and other representations.

One or more simulated workloads may then be applied to the system model at 308. A simulated workload is a measure of processing performed by a component model and the application of the simulated workload is the assignment of the simulated workload to the component model. Assignment of the simulated workload may include providing the simulated workload as an input into the component model or defining the simulated workload within the component model. For example, a simulated workload may define a number of files to be processed by the system model. Here, for example, a component model simulating a storage server included in the system model may be assigned a number of files to be processed. In another example, the simulated workload may define a flow of data to a particular component model included in the system model. Here, for example, a component model may be assigned to receive 631 kilobytes/second of data. In still another example, the simulated workload may be a ratio (e.g., ratio from 0 to 1) describing the character of the loading of a component model.

The system model is configured to simulate an impact of the simulated workload on the storage environment. The impact is the effect of the simulated workload. The impact of the simulated workload on the storage environment may be depicted or defined in a directed graph or other representations. In an example, the directed graph may show the behavior of the storage environment under the simulated workload. As a result, for example, a user can use such impact information to troubleshoot the storage environment. In another example, a user can use such impact information to design the storage environment. In yet another example, a user can use the impact information to assess the performance of a given application that is designed to make use of the storage environment.

Figure 4:
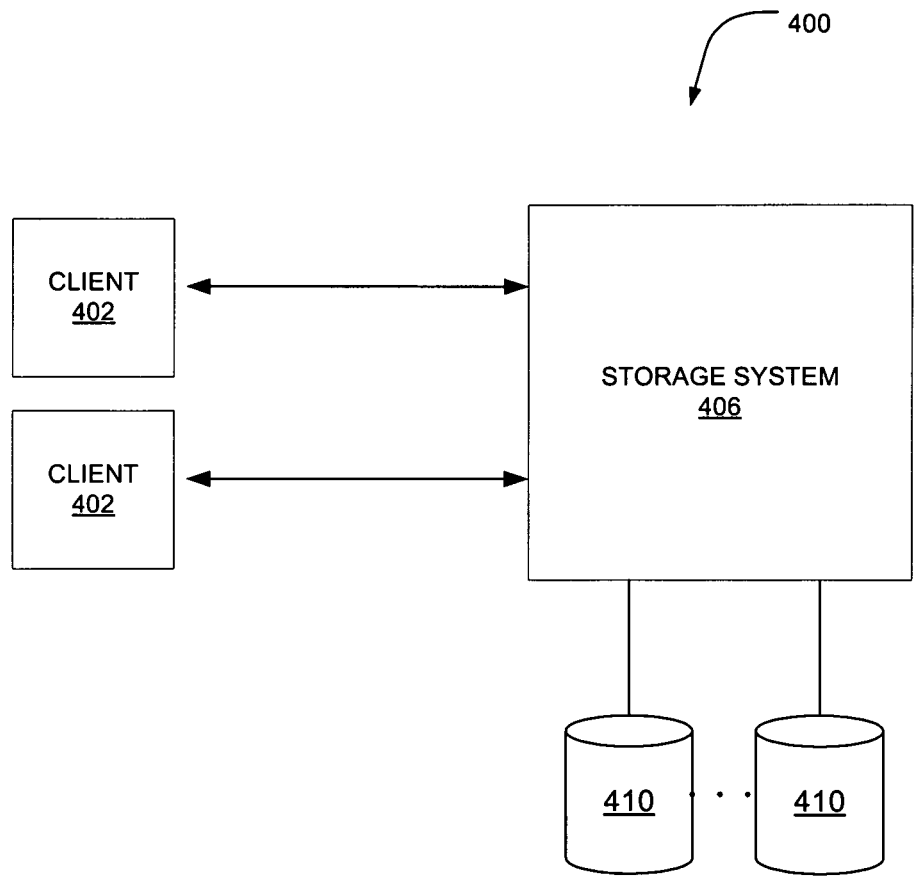
FIG. 4 depicts a simplified block diagram of a storage environment, in accordance with an example embodiment.

FIG. 4 depicts a simplified block diagram of a storage environment 400, in accordance with an example embodiment. It should be appreciated that a variety of storage environments may be modeled by the storage system analytics module. An example of storage environment 400 that may be modeled is depicted in FIG. 4. The storage environment 400 includes clients 402, storage system 406, and storage devices 410. The storage system 406 is one or more computing devices that provide a storage service related to the organization of information on writable, persistent storage devices 410, such as non-volatile memories, tapes, hard drives, optical media, and other storage devices. The storage system 406 can be deployed within a SAN environment or a NAS environment.

When used within a NAS environment, for example, storage system 406 may be embodied as a storage server that is configured to operate according to a client/server model of information delivery to thereby allow multiple client computing devices (e.g., clients 402) to access shared resources, such as files, stored on the storage server. The storage of data on a NAS environment can be deployed over a computer network that includes a geographically distributed collection on interconnected communication links, such as Ethernet, that allow clients 402 to remotely access the data (e.g., files) on the storage server. The clients 402 can communicate with the storage server by exchanging discrete frames or packets of data according to predefined protocols, such as Transmission Control/Internet Protocol (TCP/IP).

A SAN is a high-speed network that enables establishment of direct connections between storage system 406 and its storage devices 410. The SAN may thus be viewed as an extension to a storage bus and, as such, an operating system of storage system 406 enables access to stored data using block-based access protocols over an extended bus. In this context, the extended bus can be embodied as Fibre Channel, Computer System Interface (SCSI), Internet SCSI (iSCSI), and other network technologies.

Figure 5:
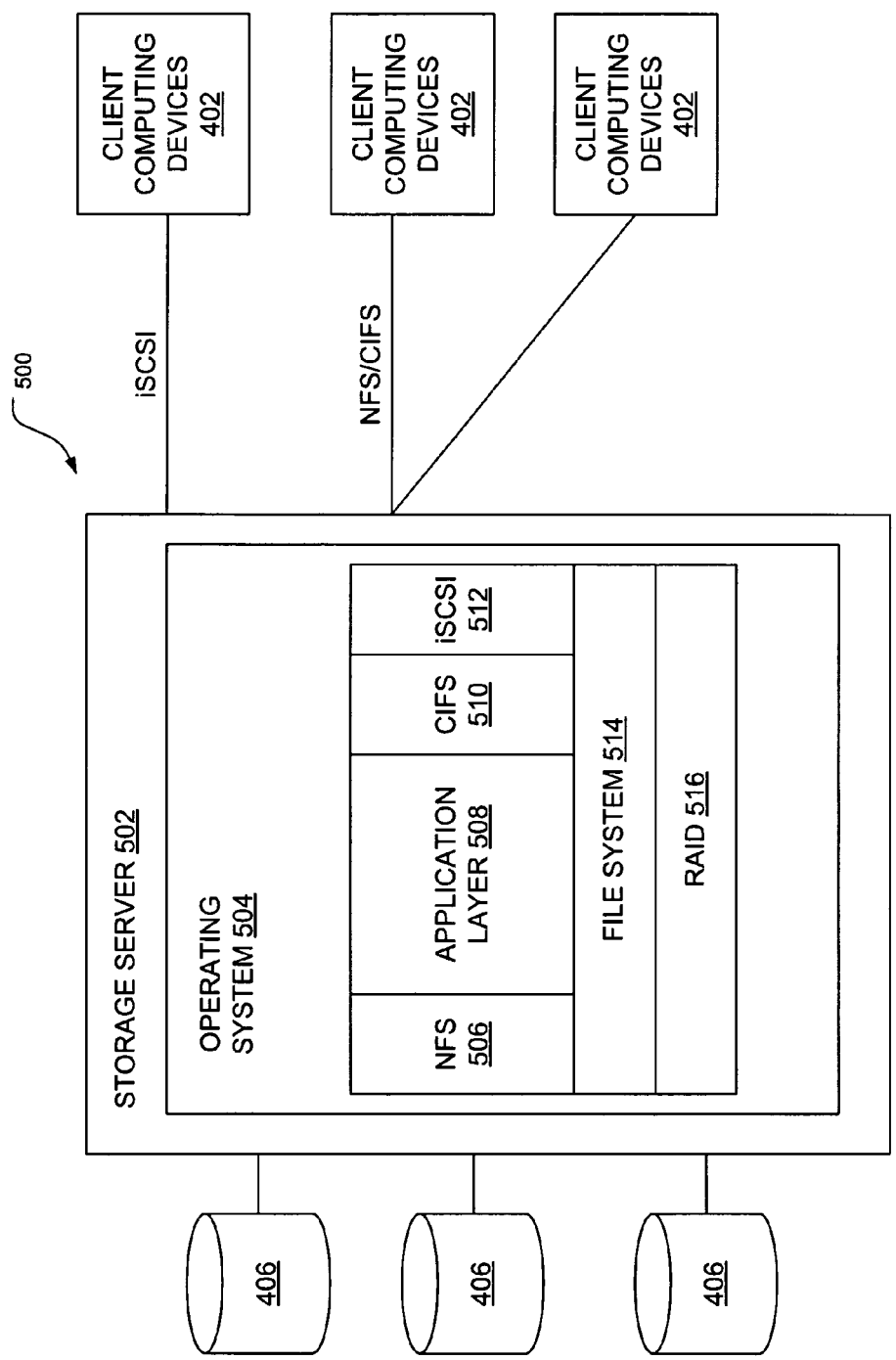
FIG. 5 depicts a simplified block diagram of another example of a storage environment and software applications associated with the storage environment, in accordance with an example embodiment, that may be modeled.

FIG. 5 depicts a simplified block diagram of another example of a storage environment 500 and software applications associated with the storage environment, in accordance with an example embodiment, that may be modeled. Components of storage environment 500 include storage server 502 in communication with client computing devices 402. Storage server 502 and client computing devices 402 may be in communication by way of a network, which may include one or more Local Area Networks (LANs) and/or Wide Area Networks (WANs), such as the Internet. The Internet is an example of a WAN that connects disparate networks to provide communication between points on various networks. The points communicate by exchanging discrete frames or packets of data according to pre-defined protocols, such as Transmission Control Protocol/Internet Protocol (TCP/IP). It should be appreciated that various protocols can be used to transmit storage data over TCP/IP, such as iSCSI, NFS, CIFS, and other protocols. In the example illustrated in FIG. 5, storage server 502 also is in communication with storage devices 208 (e.g., hard disks and tapes).

The client computing devices 402 may access various services and functions supported by storage server 502. Generally, storage server 502 is a computing device that provides file services relating to the storage, organization, and access of data stored in storage devices 406. Storage server 502 may, for example, be a NAS server. The storage server 502 includes operating system 504 that, for example, manages the software processes and/or services executing on the storage server. For example, operating system 504 may implement a write anywhere file system 514 that organizes data stored in storage devices 406 as a hierarchical structure of named directories and files.

As shown in FIG. 5, operating system 504 may support a variety of software layers 506, 508, 510, 512, 514, and 516 organized to form a multi-protocol engine that provides data paths for client computing devices 402 to access data stored in storage devices 406. The Redundant Array of Independent Disks (RAID) layer 516 provides the interface to RAID controllers. In general, a RAID controller can distribute data that storage server 502 writes to a virtual hard disk over several storage devices 406. The file system 514 forms an intermediate layer between storage devices 406 and software applications. It should be appreciated that storage devices 406 may be block-oriented storage medias and file system 514 is configured to manage the blocks used by the storage devices. In addition, file system 514 provides client computing devices 402 access to data organized in blocks by way of example directories and files. The NFS layer 506, CIFS layer 520, and iSCSI layer 512 provide support for NFS, CIFS and iSCSI protocols, respectively. Additionally included is application layer 508 that interfaces to and performs common application services for application processes, such as backup and recovery software, data retention software, and other software applications.

Figure 6:
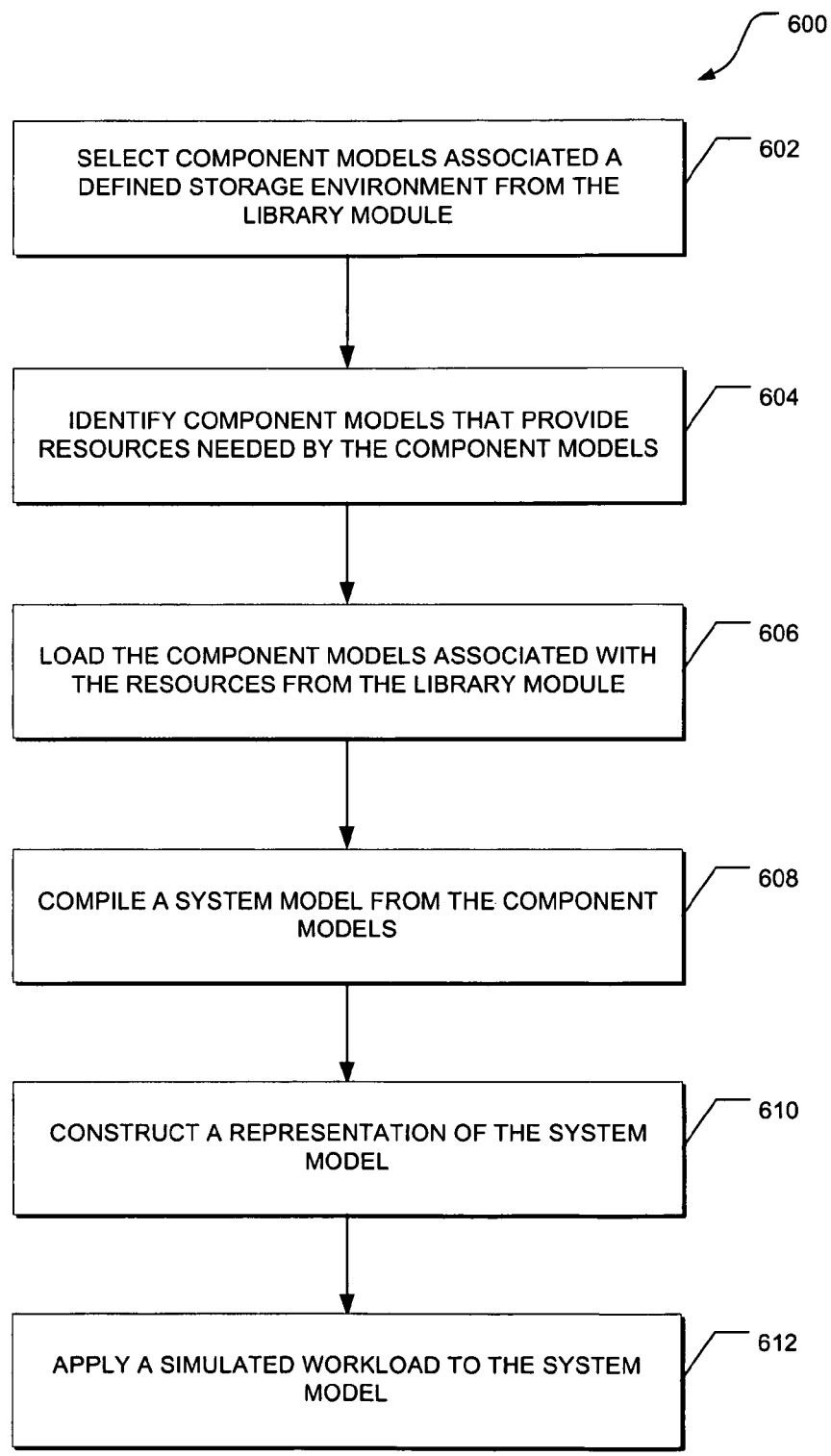
FIG. 6 depicts a flow diagram of detailed methods, in accordance with an example embodiment, for modeling a storage environment.

FIG. 6 depicts a flow diagram of detailed methods, in accordance with an example embodiment, for modeling a storage environment. In an example embodiment, method 600 may be implemented by storage system analytics module 203 of FIG. 2 and employed in computing device 202. Initially, a storage environment to be modeled is defined. To define a storage environment, a user may specify the various components included within the storage environment and the functional relationships between the components. The user may also define the functional relationships between the components. Alternatively, a program application may automatically detect the various components (and their functional relationships) within a storage environment. These detected components (and their relationships) define the storage environment. This defined storage environment is comprised of a variety of components and each component may be simulated by one or more component models, which may be stored in a library module. As depicted in FIG. 6, component models associated with the defined storage environment are selected from the library module at 602.

Each component model may define a resource needed by the component model. A resource is an input and/or support needed by the component model to function. An example of a resource is an input variable or data needed by a component model to make a particular calculation. In another example, a component model may need support component models to function. The resources are the support component models. As an example, an operating system needs to be hosted on a computing device, such as a storage server. Accordingly, a component model that simulates an operating system may define a computing device as a needed resource. At 604, component models from the library module that provide the resources are identified and loaded (or retrieved) from the library module at 606.

A system model is then composed from the loaded component models at 608. The component models when combined simulate the defined storage environment. As explained in more detail below, the composition of the system model may include associating the component models with each other based on the functional relationships defined by the component models.

Still referring to FIG. 6, a representation of the system model may then be constructed at 610. In an example, the structure of the composed system model may be in the form of or resemble a directed graph. Accordingly, the system model may be represented as a directed graph. As explained in more detail below, the directed graph may depict the component models and the functional relationships between the component models. A simulated workload may then be applied to the system model at 612 and, as explained in more detail below, the directed graph can be configured to define the impact of the simulated workload on the storage environment.

Figure 7:
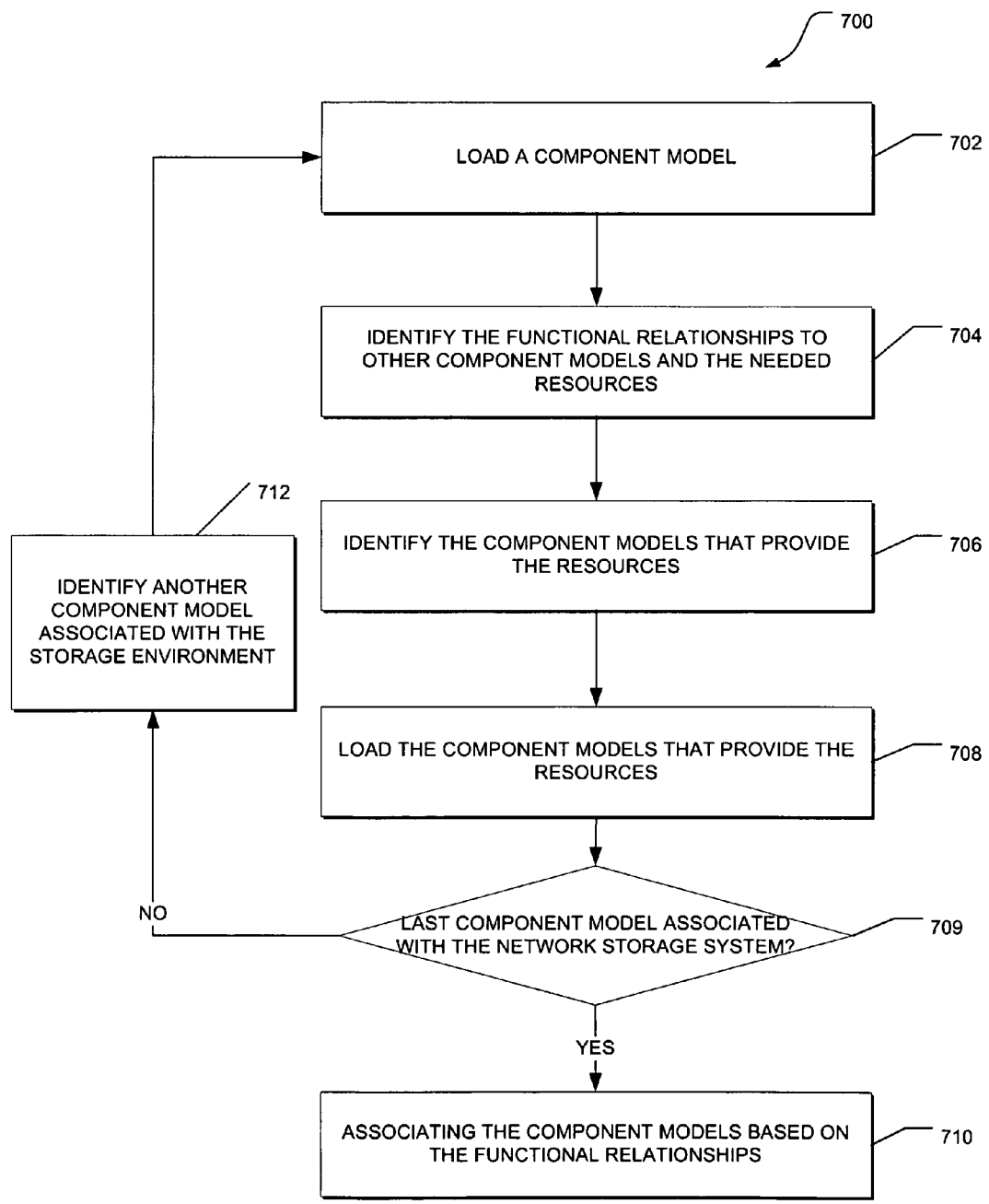
FIG. 7 depicts a flow diagram of detailed methods, in accordance with an example embodiment, for composing a system model from component models.

FIG. 7 depicts a flow diagram of detailed methods, in accordance with an example embodiment, for composing a system model from component models. In an example embodiment, method 700 may be implemented by storage system analytics module 203 of FIG. 2 and employed in computing device 202. Here, a storage environment to be modeled is initially defined. This defined storage environment is comprised of a variety of components and each of the components may be simulated by one or more component models, which are stored in a library module. As depicted in FIG. 7, a component model associated with the defined storage environment is loaded from a library module at 702. The component model may include or define one or more functional relationships with other component models and the functional relationships are identified from the component model at 704. Generally, a functional relationship describes a connection or association of a component model with another component model. For example, a functional relationship may define that a component model is in communication with another component model. In this example, the functional relationship may further define that an input of the component model is in communication with an output of another component model or vice versa. In another example, the functional relationship may also define that the component model provides its service by making use of the service provided by one or more component models.

In addition to the functional relationships, each component model may define one or more needed resources, which are also identified from the component model at 704. The resources needed by the component model are then loaded (or retrieved) from the library module at 708. As discussed above, the library module is a data structure that is configured to store component models. The component models are loaded by transferring the component models from the library to the system model. A determination is made at 709 whether the component model loaded is the last component model associated with the storage environment. If there are additional component models associated with the storage environment, then another component model associated with the storage environment is identified at 712 and this component model is loaded at 702. The methods repeat until all the component models associated with the storage environment are loaded.

If a determination is made that the component model is the last component model associated with the storage environment (or that all the component models have been loaded), then the component models are associated with each other at 710 based on the functional relationships. The determination may be made by identifying whether all the component models associated with the storage environment have been loaded. An example of the determination may include comparing the particular component model against a list of loaded component models. The component models may then be associated by, for example, connecting the component models together according to the defined functional relationships. It should be appreciated that the associations do not need to be made once all the component models are loaded into the system model. In another embodiment, the associations can be made when each component model is loaded into the system model. Since the associations are made as each component model is loaded, the system model is complete once the last component model associated with the storage environment is loaded.

Figure 8:
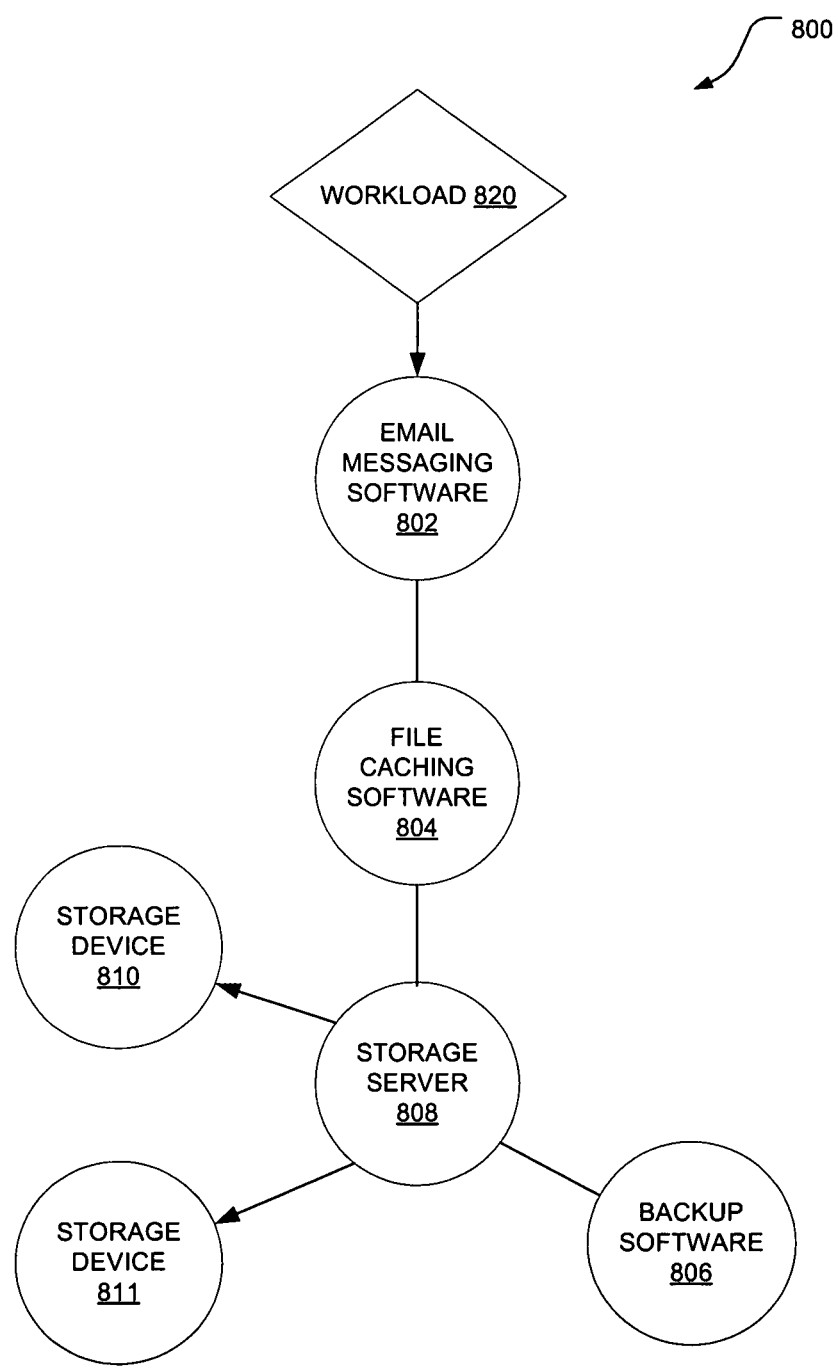
FIG. 8 depicts another directed graph representation of a system model, in accordance with an example embodiment.

FIG. 8 depicts another directed graph representation of a system model 800, in accordance with an example embodiment. The structure of the composed system model 800 may be in the form of or resemble a directed graph. Accordingly, a representation of system model 800 may be constructed with a directed graph. In effect, composed system model 800 can be represented by a directed graph. As depicted in FIG. 8, a directed graph of an example system model 800 defines component models represented as nodes and functional relationships between the component models that are represented as lines or edges between the component models.

The directed graph shows that system model 800 includes software components such as email messaging software 802, file caching software 804, and backup software 806. The nodes represent the component models that simulate the software components. The system model 800 also includes hardware component models that simulate storage server 808 and storage devices 810 and 811. Generally, the email messaging software hosts emails and makes the emails available or accessible to other client software by way of, for example, Post Office Protocol version 3 (POP3) or Internet Message Access Protocol (IMAP). The file caching software, which is in communication with email messaging software and associated with storage server, implements file caching by automatically replicating, storing, and serving data requested over, for example, NFS. Backup software 806, which is associated with storage server 808, backups data in the storage environment by mirroring the data to one or more storage devices.

In an example embodiment, the directed graph (or other representations of system model 800) may be provided in a graphical user interface. A user may interact with the directed graph through the graphical user interface. Examples of interactions may include moving the component models, connecting component models, adding component models, applying simulated workloads, and other user interactions. It should be noted that any suitable number of suitable layouts can be designed for graphical depiction of system model 800, as FIG. 8 (and FIG. 1) does not represent all possible layout options available. The displayable appearance of the regions (e.g., regions representing component models) can be defined by any suitable geometric shape, alphanumeric character, symbol, shading, pattern, and color. Furthermore, the computing devices that provide the graphical user interface may have a fixed set of layouts, utilize a defined protocol or language to define a layout, or an external structure can be reported to the computing device that defines a layout.

Still referring to FIG. 8, a simulated workload 820 may be applied to the system model, and the directed graph can visually define the impact of the simulated workload on the storage environment. For example, simulated workload 820 (e.g., a number of emails) is applied to the component model of email messaging software 802. The directed graph may illustrate the simulated impact of simulated workload 820 on the storage environment. For example, directed graph illustrates that simulated workload 820 results in data being transferred to both component models of storage devices 810 and 811, which is illustrated by the two arrows pointing from storage server 808 to storage devices 810. If simulated workload 820 is reduced, for example, the directed graph may alternatively illustrate that data is transferred to only one storage device 810 or 811, which can be illustrated by one arrow pointing from storage server 808 to one of the storage devices. Accordingly, the directed graph can be used to illustrate the simulated behavior of a storage environment when, for example, subjected to various simulated workloads. A user may therefore analyze the simulated impacts to hardware and software components as well as to the underlying architecture of the storage environment with various hypothetical changes to simulated workloads. For example, a user may use such simulated impact information to troubleshoot the storage environment without access to or testing on an actual storage environment. The user may also use such simulated impact information to design a storage environment.

Figure 9:
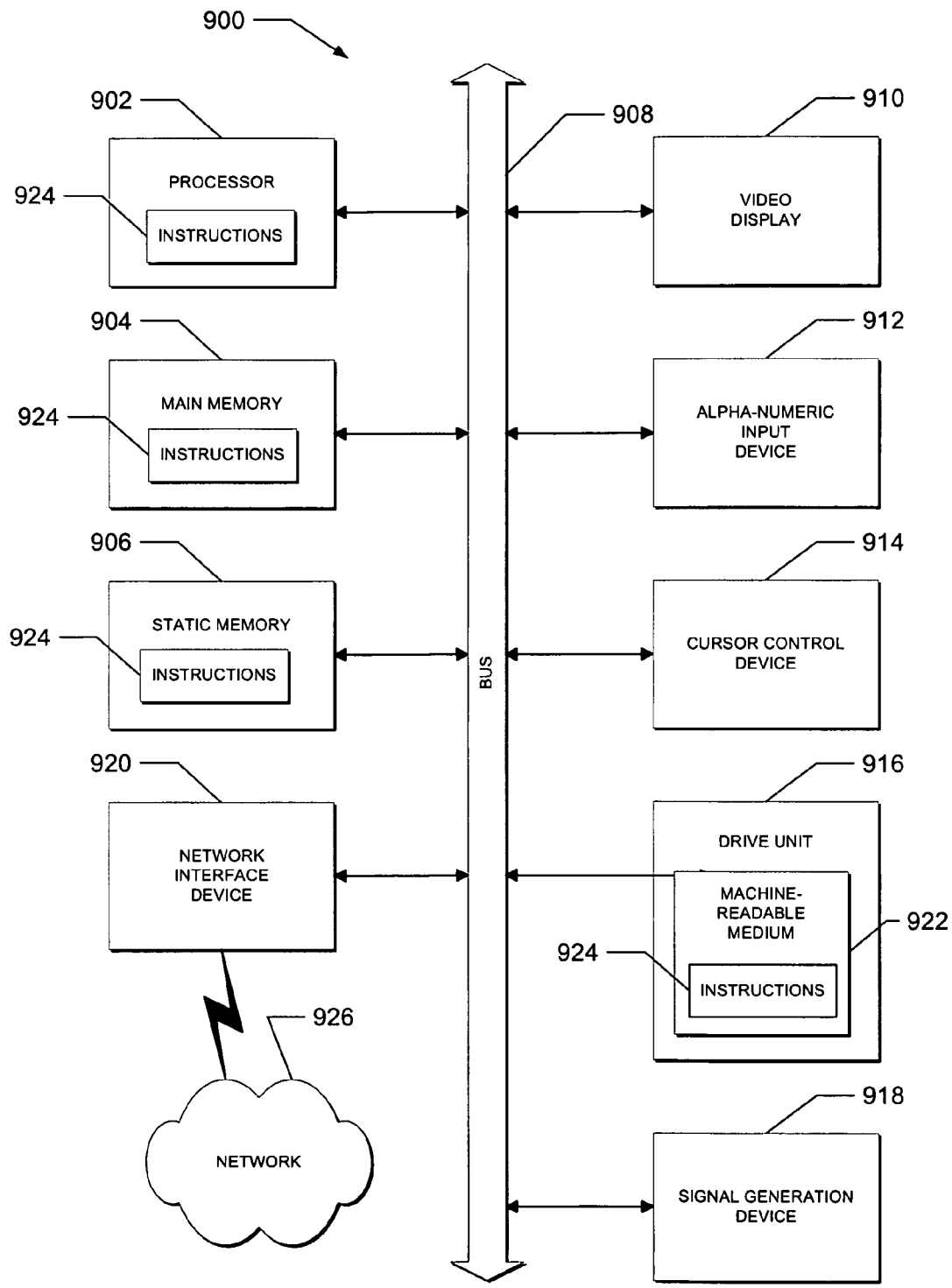
FIG. 9 depicts a simplified block diagram of a machine in the example form of a computing system within which a set of instructions, for causing the machine to perform any one or more of the methodologies discussed herein, may be executed.

FIG. 9 depicts a simplified block diagram of a machine in the example form of a computing system within which a set of instructions, for causing the machine to perform any one or more of the methodologies discussed herein, may be executed. Computing system 900 may also be referred to as a computing device and, as used herein, the terms "computing system" and "computing device" may be used interchangeably. In alternative embodiments, the machine may be connected (e.g., networked) to other machines. In a networked deployment, the machine may operate in the capacity of a server or a client machine in client-server network environment, or as a peer machine in a peer-to-peer (or distributed) network environment. The machine may be a personal computer (PC), a tablet PC, a Personal Digital Assistant (PDA), a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 900 includes processor 902 (e.g., a central processing unit (CPU), a graphics processing unit (GPU) or both), main memory 904 and static memory 906, which communicate with each other via bus 908. Computing system 900 may further include video display unit 910 (e.g., a plasma display, a liquid crystal display (LCD) or a cathode ray tube (CRT)). Computing system 900 also includes alphanumeric input device 912 (e.g., a keyboard), user interface (UI) navigation device 914 (e.g., a mouse), disk drive unit 916, signal generation device 918 (e.g., a speaker) and network interface device 920.

Disk drive unit 916 includes machine-readable medium 922 on which is stored one or more sets of instructions and data structures (e.g., software 924) embodying or utilized by any one or more of the methodologies or functions described herein. Software 924 may also reside, completely or at least partially, within main memory 904 and/or within processor 902 during execution thereof by computing system 900, with main memory 904 and processor 902 also constituting machine-readable, tangible media. Software 924 may further be transmitted or received over network 926 via network interface device 920 utilizing any one of a number of well-known transfer protocols (e.g., Hypertext Transfer Protocol (HTTP)).

While machine-readable medium 922 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for modeling storage environments may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of modeling a storage environment, the method being performed by a processor and comprising:
    loading a first component model that simulates a first component of the storage environment, wherein the first component model includes one or more rules, the one or more rules including a rule that defines a relationship to a resource needed by the first component model;
    after loading the first component model, identifying, from the rule of the first component model, a functional relationship between the first component model and a second component model, wherein the second component model includes the resource needed by the first component model;
    loading the second component model;
    composing a system model to simulate the storage environment, the system model including a directed graph that defines the functional relationship between the first component model and the second component model, including a connection of the first component model with the second component model;
    applying a simulated workload to the system model, wherein the system model simulates an impact of the simulated workload on the storage environment, and wherein the directed graph determines the impact of the simulated workload on the storage environment by visually illustrating a behavior of the storage environment; and determining an error associated with the system model.

2. The method of claim 1, wherein the directed graph visually illustrates the behavior of the storage environment by illustrating a path of data transfer using one or more arrows.

3. The method of claim 2, wherein composing the system model includes associating the first component model with the second component model based on the functional relationship between the first component model and the second component model.

4. The method of claim 1, wherein the directed graph further defines an architecture of the storage environment.

5. The method of claim 1, wherein the directed graph is non-hierarchical.

6. The method of claim 1, wherein the first component model is configured to simulate a service rendered by a user.

7. The method of claim 1, wherein the first component model defines an error associated with the first component model.

8. The method of claim 1, wherein the directed graph is presented as part of a graphical user interface that is provided on a display device, and wherein a user can interact with the directed graph to modify the system model.

9. The method of claim 1, wherein the first component model includes at least one of an interface that defines a communication boundary between the first component model and the second component model, or a code that simulates the component.

10. The method of claim 1, wherein determining the error associated with the system model comprises:
   determining a first percentage of how much the system model is used during simulation;
   determining a second percentage of how much an actual system is used, wherein the system model is a model of the actual system; and
   determining the error associated with the system model by determining a difference between the first and second percentages.

11. The method of claim 1, further comprising:
   applying the error associated to the system model in a second simulation.

12. A method of modeling a storage environment, the method being performed by a processor and comprising:
   defining a library module that includes a plurality of component models, each component model from the plurality of component models being a functional representation of a component associated with the storage environment;
   loading a first component model from the library module associated with the storage environment, wherein the first component model includes one or more rules, the one or more rules including a rule that defines a relationship to a resource needed by the first component model and defines an error associated with a simulation of the first component model;
   after loading the first component model, identifying, from the rule of the first component model, a functional relationship between the first component model and a second component model from the library module, wherein the second component model includes the resource needed by the first component;
   loading the second component model from the library module based on the identification of the functional relationship, wherein loading the second component includes loading the functional relationship from the library module;
   composing a system model to simulate the storage environment, the system model being including a directed graph that defines the functional relationship between the first component model and the second component model, including a connection of the first component model with the second component model
   applying a simulated workload to the system model, wherein the system model simulates an impact of the simulated workload on the storage environment, and wherein the directed graph determines the impact of the simulated workload on the storage environment by visually illustrating a behavior of the storage environment; and
   determining an error associated with the system model.

13. The method of claim 12, directed graph visually illustrates the behavior of the storage environment by illustrating a path of data transfer using one or more arrows.

14. The method of claim 12, wherein the directed graph further defines an architecture of the storage environment.

15. The method of claim 14, wherein the directed graph is presented as part of a graphical user interface that is provided on a display device, and wherein a user can interact with the directed graph to modify the system.

16. The method of claim 12, wherein composing the system model comprises associating the first component model with the second component model based on the functional relationship.

17. A storage system for analyzing a storage environment by identifying an impact of a simulated workload on the storage environment, the storage system comprising:
   a library module configured to store a plurality of component models, each component model configured to simulate a component of the storage environment;
   a provisioning manager module configured to: (1) load a first component model from the library module, the first component model including one or more rules, the one or more rules including a rule that defines a relationship to a resource needed by the component model; (2) after loading the first component model, identify, from the rule of the first component model, a functional relationship between the first component model and a second component model that includes the resource needed by the first component model; (3) load the second component model; and (4) compose a system model to simulate the storage environment, the system model being including a directed graph that defines the functional relationship between the first component model and the second component model, including a connection of the first component model with the second component model; and
   a hypothetical analyzer module configured to apply a simulated workload to the system model, wherein the system model simulates an impact of the simulated workload on the storage environment, and wherein the directed graph determines the impact of the simulated workload on the storage environment by visually illustrating a behavior of the storage environment.

18. A non-transitory computer-readable medium storing instructions that, when executed by a processor, cause the processor to perform operations comprising:
   loading a first component model that simulates a first component of a storage environment, wherein the first component model includes one or more rules, the one or more rules including a rule that defines a relationship to a resource needed by the first component model;
   after loading the first component model, identifying, from the rule of the first component model, a functional relationship between the first component model and a second component model, wherein the second component model includes the resource needed by the first component model;
   loading the second component model;
   composing a system model to simulate the storage environment, the system model including a directed graph that defines the functional relationship between the first component model and the second component model, including a connection of the first component model with the second component model; and
   applying a simulated workload to the system model, wherein the system model simulates an impact of the simulated workload on the storage environment, and wherein the directed graph determines the impact of the simulated workload on the storage environment by visually illustrating a behavior of the storage environment.

19. The non-transitory computer-readable medium of claim 18, wherein the instructions further cause the processor to construct the directed graph before applying the simulated workload to the system model.

20. The non-transitory computer-readable medium of claim 19, wherein the directed graph is presented as part of a graphical user interface that is provided on a display device, and wherein a user can interact with the directed graph to modify the system model.

21. The non-transitory computer-readable medium of claim 20, wherein the directed graph visually illustrates a behavior of the storage environment by illustrating a path of data transfer using one or more arrows.

* * * * *